(12) United States Patent
Hsieh et al.

(10) Patent No.: US 11,760,876 B2
(45) Date of Patent: Sep. 19, 2023

(54) RESIN COMPOSITION AND ARTICLE MADE THEREFROM

(71) Applicant: Elite Material Co., Ltd., Taoyuan (TW)

(72) Inventors: Chen-Yu Hsieh, Taoyuan (TW); Chih-Wei Lin, Taoyuan (TW); Ching Lo, Taoyuan (TW)

(73) Assignee: ELITE MATERIAL CO., LTD., Taoyuan (TW)

( * ) Notice: Subject to any disclaimer, the term of this patent is extended or adjusted under 35 U.S.C. 154(b) by 208 days.

(21) Appl. No.: 17/513,979

(22) Filed: Oct. 29, 2021

(65) Prior Publication Data
US 2023/0062178 A1    Mar. 2, 2023

(30) Foreign Application Priority Data
Aug. 23, 2021 (TW) .................. 110131150

(51) Int. Cl.
| | |
|---|---|
| C08L 85/02 | (2006.01) |
| C08L 79/08 | (2006.01) |
| C08L 71/12 | (2006.01) |
| C08L 25/10 | (2006.01) |
| C08J 5/24 | (2006.01) |
| B32B 27/18 | (2006.01) |
| B32B 5/08 | (2006.01) |
| C08L 71/00 | (2006.01) |
| C09J 7/30 | (2018.01) |
| C09J 171/00 | (2006.01) |
| B32B 5/02 | (2006.01) |
| B32B 15/14 | (2006.01) |
| B32B 5/26 | (2006.01) |
| B32B 15/20 | (2006.01) |

(52) U.S. Cl.
CPC .............. *C08L 71/00* (2013.01); *B32B 5/024* (2013.01); *B32B 5/263* (2021.05); *B32B 15/14* (2013.01); *B32B 15/20* (2013.01); *C08J 5/244* (2021.05); *C09J 7/30* (2018.01); *C09J 171/00* (2013.01); *B32B 2260/021* (2013.01); *B32B 2260/046* (2013.01); *B32B 2262/101* (2013.01); *B32B 2307/206* (2013.01); *B32B 2307/3065* (2013.01); *B32B 2307/7265* (2013.01); *B32B 2457/08* (2013.01); *C08J 2371/12* (2013.01); *C08J 2409/00* (2013.01); *C08J 2409/06* (2013.01); *C08J 2479/08* (2013.01); *C09J 2400/14* (2013.01); *C09J 2400/163* (2013.01); *C09J 2423/00* (2013.01); *C09J 2471/00* (2013.01); *C09J 2479/08* (2013.01)

(58) Field of Classification Search
None
See application file for complete search history.

(56) References Cited

FOREIGN PATENT DOCUMENTS

CN        104447869 A    *  3/2015    ............ C07F 9/6574

OTHER PUBLICATIONS

Machine translation of CN-104447869-A (no date).*

* cited by examiner

*Primary Examiner* — Michael J Feely
(74) *Attorney, Agent, or Firm* — MUNCY, GEISSLER, OLDS & LOWE, P.C.

(57) ABSTRACT

A resin composition includes 20 parts by weight to 45 parts by weight of a phosphorus-containing bismaleimide and 100 parts by weight of a thermosetting resin, wherein the phosphorus-containing bismaleimide has a structure of Formula (I); the thermosetting resin is selected from a vinyl-containing polyphenylene ether resin, a maleimide resin, a polyolefin resin, a prepolymer of maleimide resin, and a combination thereof. The resin composition may be used to make a prepreg, a resin film, a laminate or a printed circuit board, and at least one of the following properties can be improved, including flame retardancy, outgassing properties, arc resistance, copper foil peeling strength, X-axis coefficient of thermal expansion, glass transition temperature and water absorption rate.

Formula (I)

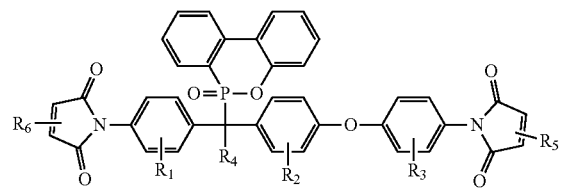

11 Claims, No Drawings

RESIN COMPOSITION AND ARTICLE MADE THEREFROM

CROSS-REFERENCE TO RELATED APPLICATION

This application claims the priority benefits of Taiwan Patent Application No. 110131150, filed on Aug. 23, 2021. The entirety the above-mentioned patent application is hereby incorporated by reference herein and made a part of this specification.

BACKGROUND

1. Field of the Disclosure

The present disclosure relates to a resin composition and more particularly to a resin composition useful for preparing a prepreg, a resin film, a laminate or a printed circuit board.

2. Description of Related Art

In recent years, due to the development of electronic signal transmission toward 5G and the trend of miniaturization and high performance of electronic equipment, communication devices and personal computers, circuit boards were also developed toward multi-layer configuration, high density trace interconnection, and high speed signal transmission, thereby presenting higher challenges to the overall performance of circuit laminates such as copper-clad laminates.

Conventional phosphorus-containing flame retardants have been widely used in FR-4 copper-clad laminates; however, they tend to causes problems such as low glass transition temperature and high water absorption rate. In addition, higher amount of the phosphorus-containing flame retardants was usually used to achieve a V-0 flame retardancy, and increased amount further deteriorated the adhesion property. Therefore, there is a need for developing a halogen-free phosphorus-containing flame retardant resin composition which have high flame retardancy even at relative low phosphorus addition amount and which can be used to make articles with high glass transition temperature and high adhesion property. In addition, for laminate materials used in aerospace applications, low outgassing and high arc resistance are also important properties.

SUMMARY

To overcome the problems facing prior arts, particularly one or more above-mentioned technical problems of conventional materials, it is a primary object of the present disclosure to provide a resin composition and an article made therefrom which may overcome at least one of the above-mentioned technical problems.

To achieve the above-mentioned objects, the present disclosure provides a resin composition, comprising 20 parts by weight to 45 parts by weight of a phosphorus-containing bismaleimide (abbreviated as "DOPO-BMI") and 100 parts by weight of a thermosetting resin, wherein:
the phosphorus-containing bismaleimide has a structure of Formula (I):

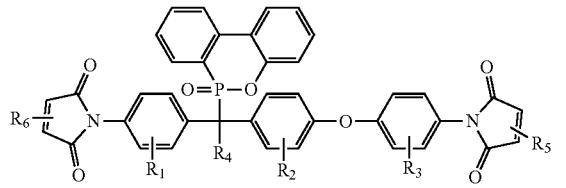

Formula (I)

wherein $R_1$ is a hydrogen atom, a methyl group or an ethyl group; $R_2$ is a hydrogen atom or a methyl group; $R_3$ is a hydrogen atom or a $C_1$-$C_6$ alkyl group; $R_4$ is a hydrogen atom or a $C_1$-$C_6$ alkyl group; $R_5$ is a hydrogen atom or a $C_1$-$C_6$ alkyl group; and $R_6$ is a hydrogen atom or a $C_1$-$C_6$ alkyl group; and
the thermosetting resin is selected from the group consisting of a vinyl-containing polyphenylene ether resin, a maleimide resin, a polyolefin resin, a prepolymer of maleimide resin, and a combination thereof.

For example, in one embodiment, the vinyl-containing polyphenylene ether resin comprises a vinylbenzyl-containing biphenyl polyphenylene ether resin, a methacrylate-containing polyphenylene ether resin, a vinylbenzyl-containing bisphenol A polyphenylene ether resin, a chain-extended vinyl-containing polyphenylene ether resin or a combination thereof.

For example, in one embodiment, the maleimide resin comprises a bisphenol A diphenyl ether bismaleimide resin, bis(3-ethyl-5-methyl-4-maleimidephenyl)methane, a maleimide resin of Formula (IV) as described below, 4,4'-diphenylmethane bismaleimide resin or a combination thereof.

For example, in one embodiment, the polyolefin resin comprises a styrene-butadiene copolymer, a polybutadiene resin, or a combination thereof.

For example, in one embodiment, the prepolymer of maleimide resin comprises a prepolymer of diallyl compound (such as but not limited to diallyl bisphenol A) and maleimide resin, a prepolymer of diamine and maleimide resin, a prepolymer of multi-functional amine and maleimide resin, a prepolymer of acid phenol compound and maleimide resin, or a combination thereof.

For example, in one embodiment, the resin composition further comprises inorganic filler, flame retardant, curing accelerator, polymerization inhibitor, solvent, silane coupling agent, coloring agent, toughening agent, or a combination thereof.

To achieve the above-mentioned objects, the present disclosure further provides an article made from the resin composition, including a prepreg, a resin film, a laminate or a printed circuit board.

For example, in one embodiment, articles made from the resin composition disclosed herein have one, more or all of the following properties:
an amount of collected volatile condensable materials (CVCM) of less than or equal to 0.019% and a total mass loss (TML) of less than or equal to 0.67% as measured from an outgassing test by reference to IPC-TM-650 2.6.4B;
an arc resistance as measured by reference to IPC-TM-650 2.5.1B of greater than or equal to 105 seconds;
a copper foil peeling strength as measured by reference to IPC-TM-650 2.4.8 of greater than or equal to 4.05 lb/in;

an X-axis coefficient of thermal expansion as measured by reference to IPC-TM-650 2.4.24.5 of less than or equal to 13.2 ppm/° C.;

a flame retardancy of V-0 rating as measured by reference to UL94;

a glass transition temperature as measured by reference to IPC-TM-650 2.4.24.5 of greater than or equal to 201° C.; and a water absorption rate as measured by reference to IPC-TM-650 2.6.2.1a of less than or equal to 0.39%.

DESCRIPTION OF THE EMBODIMENTS

To enable those skilled in the art to further appreciate the features and effects of the present disclosure, words and terms contained in the specification and appended claims are described and defined. Unless otherwise defined, all technical and scientific terms used herein have the same meaning as commonly understood by those of ordinary skill in the art to which this disclosure pertains. In the case of conflict, the present document and definitions contained herein will control.

As used herein, the term "comprises," "comprising," "includes," "including," "encompass," "encompassing," "has," "having" or any other variant thereof is construed as an open-ended transitional phrase intended to cover a non-exclusive inclusion. For example, a composition or article of manufacture that comprises a list of elements is not necessarily limited to only those elements but may include other elements not expressly listed or inherent to such composition or article of manufacture. Further, unless expressly stated to the contrary, the term "or" refers to an inclusive or and not to an exclusive or. For example, a condition "A or B" is satisfied by any one of the following: A is true (or present) and B is false (or not present), A is false (or not present) and B is true (or present), and both A and B are true (or present). In addition, whenever open-ended transitional phrases are used, such as "comprises," "comprising," "includes," "including," "encompass," "encompassing," "has," "having" or any other variant thereof, it is understood that transitional phrases such as "consisting essentially of" and "consisting of" are also disclosed and included.

In this disclosure, features or conditions presented as a numerical range or a percentage range are merely for convenience and brevity. Therefore, a numerical range or a percentage range should be interpreted as encompassing and specifically disclosing all possible subranges and individual numerals or values therein, particularly all integers therein. For example, a range of "1 to 8" should be understood as explicitly disclosing all subranges such as 1 to 7, 2 to 8, 2 to 6, 3 to 6, 4 to 8, 3 to 8 and so on, particularly all subranges defined by integers, as well as disclosing all individual values such as 1, 2, 3, 4, 5, 6, 7 and 8. Similarly, a range of "between 1 and 8" should be understood as explicitly disclosing all ranges such as 1 to 8, 1 to 7, 2 to 8, 2 to 6, 3 to 6, 4 to 8, 3 to 8 and so on and encompassing the end points of the ranges. Unless otherwise defined, the aforesaid interpretation rule should be applied throughout the present disclosure regardless broadness of the scope.

Whenever amount, concentration or other numeral or parameter is expressed as a range, a preferred range or a series of upper and lower limits, it is understood that all ranges defined by any pair of the upper limit or preferred value and the lower limit or preferred value are specifically disclosed, regardless whether these ranges are explicitly described or not. In addition, unless otherwise defined, whenever a range is mentioned, the range should be interpreted as inclusive of the endpoints and every integers and fractions in the range.

Given the intended purposes and advantages of this disclosure are achieved, numerals or figures have the precision of their significant digits. For example, 40.0 should be understood as covering a range of 39.50 to 40.49.

As used herein, a Markush group or a list of items is used to describe examples or embodiments of the present disclosure. A skilled artisan will appreciate that all subgroups of members or items and individual members or items of the Markush group or list can also be used to describe the present disclosure. For example, when X is described as being "selected from a group consisting of $X_1$, $X_2$ and $X_3$," it is intended to disclose the situations of X is $X_1$ and X is $X_1$ and/or $X_2$ and/or $X_3$. In addition, when a Markush group or a list of items is used to describe examples or embodiments of the present disclosure, a skilled artisan will understand that any subgroup or any combination of the members or items in the Markush group or list may also be used to describe the present disclosure. Therefore, for example, when X is described as being "selected from a group consisting of $X_1$, $X_2$ and $X_3$," and Y is described as being "selected from a group consisting of $Y_1$, $Y_2$ and $Y_3$," the disclosure shall be interpreted as any combination of X is $X_1$ or $X_2$ or $X_3$ and Y is $Y_1$ or $Y_2$ or $Y_3$.

Unless otherwise specified, according to the present disclosure, a compound refers to a chemical substance formed by two or more elements bonded with chemical bonds and may comprise a small molecule compound and a polymer compound, but not limited thereto. Any compound disclosed herein is interpreted to not only include a single chemical substance but also include a class of chemical substances having the same kind of components or having the same property. In addition, as used herein, a mixture refers to a combination of two or more compounds.

As used herein, a prepolymer refers to a product, derived from a compound or a mixture (monomer) that is subjected to prepolymerization (partial polymerization), contains unreacted reactive functional groups or has the potential to undergo further polymerization. For example, the progress of the prepolymerization reaction may be confirmed and controlled as needed by determining the molecular weight or the level of viscosity. Prepolymerization reaction disclosed herein may be initiated by the use of solvent and heating or by a thermal melting reaction, but not limited thereto. For example, prepolymerization by the use of solvent and heating refers to dissolving the raw material in a solvent, optionally adding a catalyst or a polymerization inhibitor, followed by heating after all components are melted in the solvent, so as to initiate the prepolymerization reaction. Prepolymerization by a thermal melting reaction refers to heating to melt the raw material and at the same time initiate the prepolymerization reaction. The product after prepolymerization (i.e., the prepolymer) has a molecular weight of greater than that of the compound monomer or mixture monomer prior to prepolymerization and may be analyzed by a gel permeation chromatograph (GPC). In the graph of retention time (X-axis) and molecular weight (Y-axis), the distribution peak of molecular weight of the prepolymer is located closer to the Y-axis (shorter retention time), and the distribution peak of molecular weight of the monomer is located behind (longer retention time). In addition, the prepolymer obtained has a wider distribution of molecular weight that contains multiple adjacent peaks, while the monomer has a narrower distribution of molecular weight that contains only one peak.

To those of ordinary skill in the art to which this disclosure pertains, a resin composition containing an additive and three compounds (e.g., A, B and C), a total of four components, is different form a resin composition containing the additive and a prepolymer formed by the three compounds (e.g., A, B and C), a total of two components, as they are completely different from each other in the aspects of preparation method, physical or chemical properties of the resin composition and properties of an article or product made therefrom. For example, the former involves mixing A, B, C and the additive to form the resin composition; in contrast, the latter involves first subjecting a mixture comprising A, B and C to a prepolymerization reaction at proper conditions to form a prepolymer and then mixing the prepolymer with the additive to form the resin composition. For example, to those of ordinary skill in the art to which this disclosure pertains, the two resin compositions have completely different compositions; in addition, because the prepolymer formed by A, B and C functions completely different from A, B and C individually or collectively in the resin composition, the two resin compositions should be construed as completely different chemical substances and have completely different chemical statuses. For example, to those of ordinary skill in the art to which this disclosure pertains, because the two resin compositions are completely different chemical substances, articles made therefrom will not have the same properties. For example, to a resin composition containing a crosslinking agent and a prepolymer formed by A, B and C, since A, B and C have been partially reacted or converted during the prepolymerization reaction to form the prepolymer, during the process of heating to semi-cure the resin composition at a high temperature condition, a partial crosslinking reaction occurs between the prepolymer and the crosslinking agent but not between A, B and C individually and the crosslinking agent. As such, articles made from the two resin compositions will be completely different and have completely different properties.

Unless otherwise specified, according to the present disclosure, a modification comprises a product derived from a resin with its reactive functional group modified, a product derived from a crosslinking reaction of a resin and other resins, a product derived from homopolymerizing a resin, a product derived from copolymerizing a resin and other resins, etc. For example, such as but not limited thereto, a modification may refer to replacing a hydroxyl group with a vinyl group via a chemical reaction, or obtaining a terminal hydroxyl group from a chemical reaction of a terminal vinyl group and p-aminophenol.

As used herein, "vinyl-containing" refers to the presence of an ethylenic carbon-carbon double bond (C=C) or a functional group derived therefrom in a compound. Therefore, examples of "vinyl-containing" may include, but not limited to, a structure containing a vinyl group, an allyl group, a vinylbenzyl group, a methacrylate group or the like. Unless otherwise specified, the position of the aforesaid functional group is not particularly limited and may be located at the terminal of a long-chain structure. Therefore, for example, a vinyl-containing polyphenylene ether resin represents a polyphenylene ether resin containing a vinyl group, an allyl group, a vinylbenzyl group, a methacrylate group or the like, but not limited thereto.

As used herein, part(s) by weight represents weight part(s) in any weight unit, such as but not limited to gram, kilogram, pound and so on. For example, 100 parts by weight of the prepolymer may represent 100 grams of the prepolymer, 100 kilograms of the prepolymer or 100 pounds of the prepolymer, but not limited thereto.

The following embodiments and examples are illustrative in nature and are not intended to limit the present disclosure and its application. In addition, the present disclosure is not bound by any theory described in the background and summary above or the following embodiments or examples.

As described above, a primary object of the present disclosure is to provide a resin composition, comprising 20 parts by weight to 45 parts by weight of a phosphorus-containing bismaleimide and 100 parts by weight of a thermosetting resin, wherein:

the phosphorus-containing bismaleimide has a structure of Formula (I):

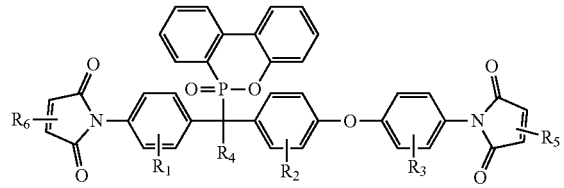

Formula (I)

wherein $R_1$ is a hydrogen atom, a methyl group or an ethyl group;

$R_2$ is a hydrogen atom or a methyl group;

$R_3$ is a hydrogen atom or a $C_1$-$C_6$ alkyl group (such as $C_1$, $C_2$, $C_3$, $C_4$, $C_5$ or $C_6$ alkyl group);

$R_4$ is a hydrogen atom or a $C_1$-$C_6$ alkyl group (such as $C_1$, $C_2$, $C_3$, $C_4$, $C_5$ or $C_6$ alkyl group);

$R_5$ is a hydrogen atom or a $C_1$-$C_6$ alkyl group (such as $C_1$, $C_2$, $C_3$, $C_4$, $C_5$ or $C_6$ alkyl group);

$R_6$ is a hydrogen atom or a $C_1$-$C_6$ alkyl group (such as $C_1$, $C_2$, $C_3$, $C_4$, $C_5$ or $C_6$ alkyl group); and the thermosetting resin is selected from the group consisting of a vinyl-containing polyphenylene ether resin, a maleimide resin, a polyolefin resin, a prepolymer of maleimide resin, and a combination thereof.

For example, in one embodiment, the phosphorus-containing bismaleimide may have a structure of Formula (II):

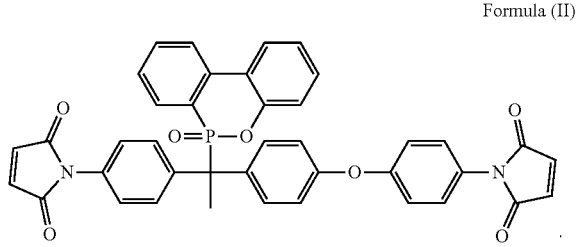 [SMILES: CC(c1ccc(Oc2ccc(N3C(=O)C=CC3=O)cc2)cc1)(c1ccc(N2C(=O)C=CC2=O)cc1)P1(=O)Oc2ccccc2-c2ccccc21]

Formula (II)

For example, in one embodiment, the vinyl-containing polyphenylene ether resin may comprise various vinyl-containing polyphenylene ether resins known in the art to which this disclosure pertains. The vinyl-containing polyphenylene ether resin suitable for the present disclosure is not particularly limited and may comprise any one or more commercially available products, self-prepared products, or a combination thereof. Examples include but are not limited to a polyphenylene ether resin containing a vinyl group, an allyl group, a vinylbenzyl group, or a methacrylate group.

For example, in one embodiment, the vinyl-containing polyphenylene ether resin comprises a vinylbenzyl-containing biphenyl polyphenylene ether resin, a methacrylate-containing polyphenylene ether resin (i.e., methacryloyl-containing polyphenylene ether resin), an allyl-containing polyphenylene ether resin, a vinylbenzyl-containing bisphenol A polyphenylene ether resin, a chain-extended vinyl-containing polyphenylene ether resin or a combination thereof. For example, the vinyl-containing polyphenylene ether resin may be a vinylbenzyl-containing biphenyl polyphenylene ether resin with a number average molecular weight of about 1200 (such as OPE-2st 1200, available from Mitsubishi Gas Chemical Co., Inc.), a vinylbenzyl-containing biphenyl polyphenylene ether resin with a number average molecular weight of about 2200 (such as OPE-2st 2200, available from Mitsubishi Gas Chemical Co., Inc.), a methacrylate-containing polyphenylene ether resin with a number average molecular weight of about 1900 to 2300 (such as SA9000, available from Sabic), a vinylbenzyl-containing bisphenol A polyphenylene ether resin with a number average molecular weight of about 2400 to 2800, a chain-extended vinyl-containing polyphenylene ether resin with a number average molecular weight of about 2200 to 3000, or a combination thereof. The chain-extended vinyl-containing polyphenylene ether resin may include various polyphenylene ether resins disclosed in the US Patent Application Publication No. 2016/0185904 A1, all of which are incorporated herein by reference in their entirety.

For example, in one embodiment, the maleimide resin comprises a monomer containing at least one maleimide group or a combination thereof. Unless otherwise specified, the maleimide resin used in the present disclosure is not particularly limited and may include any one or more maleimide resins useful for preparing a prepreg, a resin film, a laminate or a printed circuit board. In some embodiments, any one or more of the maleimide resins below may be used: 4,4'-diphenylmethane bismaleimide, oligomer of phenylmethane maleimide (a.k.a. polyphenylmethane maleimide), bisphenol A diphenyl ether bismaleimide, 3,3'-dimethyl-5, 5'-diethyl-4,4'-diphenylmethane bismaleimide (a.k.a. bis(3-ethyl-5-methyl-4-maleimidephenyl) methane), 3,3'-dimethyl-5,5'-dipropyl-4,4'-diphenylmethane bismaleimide, biphenyl maleimide, m-phenylene bismaleimide, 4-methyl-1,3-phenylene bismaleimide, 1,6-bismaleimide-(2,2,4-trimethyl)hexane, N-2,3-xylylmaleimide, N-2,6-xylyl maleimide, N-phenylmaleimide, diethyl bismaleimidotoluene, vinyl benzyl maleimide (VBM), maleimide resin containing aliphatic long chain structure, or a combination thereof. Unless otherwise specified, the maleimide resins described above should be construed as including the modifications thereof.

For example, in one embodiment, the maleimide resin may have a structure of Formula (IV):

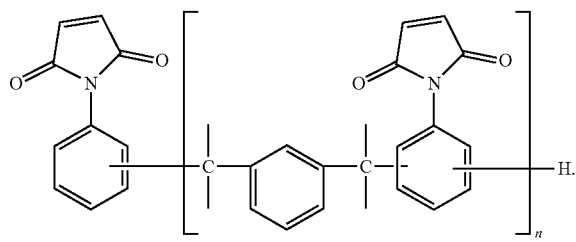

Formula (IV) wherein 1 ≤ n ≤ 5

For example, examples of the maleimide resin may include products such as BMI-1000, BMI-1000H, BMI-1100, BMI-1100H, BMI-2000, BMI-2300, BMI-3000, BMI-3000H, BMI-4000, BMI-5000, BMI-5100, BMI-TMH, BMI-7000 and BMI-7000H available from Daiwakasei Industry, products such as BMI-70 and BMI-80 available from K.I Chemical Industry Co., Ltd., products such as MIR-3000 and MIR-5000 available from Nippon Kayaku, or products such as DE-TDAB available from Evonik Industries.

For example, the maleimide resin containing aliphatic long chain structure may include products such as BMI-689, BMI-1400, BMI-1500, BMI-1700, BMI-2500, BMI-3000, BMI-5000 and BMI-6000 available from Designer Molecules Inc.

For example, in one embodiment, examples of the polyolefin resin may include but are not limited to styrene-butadiene-divinylbenzene terpolymer, styrene-butadiene-maleic anhydride terpolymer, vinyl-polybutadiene-urethane oligomer, styrene-butadiene copolymer, hydrogenated styrene-butadiene copolymer (a.k.a. styrene-ethylene-butene-styrene block polymer), styrene-isoprene copolymer, hydrogenated styrene-isoprene copolymer, hydrogenated styrene-butadiene-divinylbenzene terpolymer, polybutadiene (i.e., homopolymer of butadiene), maleic anhydride-butadiene copolymer, methyl styrene copolymer or a combination thereof. Preferably, the polyolefin resin may comprise styrene-butadiene copolymer, hydrogenated styrene-butadiene copolymer, polybutadiene, styrene-butadiene-maleic anhydride terpolymer, maleic anhydride-butadiene copolymer or a combination thereof. For example, the polybutadiene may comprise a polybutadiene without any reactive group, a hydrogenated polybutadiene, a hydroxyl-containing polybutadiene, a phenolic hydroxyl-containing polybutadiene (having a polybutadiene structure and containing a phenolic hydroxyl group), a carboxyl-containing polybutadiene, an anhydride-containing polybutadiene, an epoxy-containing polybutadiene, an isocyanate-containing polybutadiene, an urethane-containing polybutadiene, a hydrogenated polybutadiene with its terminal hydroxyl groups modified by vinyl groups (therefore without any hydroxyl group) or a combination thereof. For example, the polybutadiene may comprise an epoxy-containing polybutadiene.

For example, in one embodiment, the prepolymer of maleimide resin may comprise, but not limited to, a prepolymer of diallyl compound (such as but not limited to diallyl bisphenol A) and maleimide resin, a prepolymer of diamine and maleimide resin, a prepolymer of multi-functional amine and maleimide resin, a prepolymer of acid phenol compound and maleimide resin, or a combination thereof. For example, the acid phenol compound may be p-aminophenol. For example, the prepolymer of maleimide resin may be products such as Homide 801 available from HOS-Technik.

In addition to the aforesaid components, the resin composition disclosed herein may also further optionally comprise inorganic filler, flame retardant, curing accelerator, polymerization inhibitor, solvent, silane coupling agent, coloring agent, toughening agent, or a combination thereof.

For example, the inorganic filler may be any one or more inorganic fillers suitable for preparing a prepreg, a resin film, a laminate or a printed circuit board, examples including but not limited to silica (fused, non-fused, porous or hollow type), aluminum oxide, aluminum hydroxide, magnesium oxide, magnesium hydroxide, calcium carbonate, aluminum nitride, boron nitride, aluminum silicon carbide, silicon carbide, titanium dioxide, barium titanate, lead titanate, strontium titanate, calcium titanate, magnesium titanate, barium zirconate, lead zirconate, magnesium zirconate, lead zirconate titanate, zinc molybdate, calcium molybdate, magnesium molybdate, ammonium molybdate, zinc molybdate-modified talc, zinc oxide, zirconium oxide, mica, boehmite (AlOOH), calcined talc, talc, silicon nitride, zirconium tungstate, petaliteor, calcined kaolin or a combination thereof. Moreover, the inorganic filler can be spherical, fibrous, plate-like, particulate, flake-like or whisker-like in shape and can be optionally pretreated by a silane coupling agent.

For example, the flame retardant used herein may be any one or more flame retardants useful for preparing a prepreg, a resin film, a laminate or a printed circuit board, examples including but not limited to a phosphorus-containing flame retardant, preferably comprising ammonium polyphosphate, hydroquinone bis-(diphenyl phosphate), bisphenol A bis-(diphenylphosphate), tri(2-carboxyethyl) phosphine (TCEP), phosphoric acid tris(chloroisopropyl) ester, trimethyl phosphate (TMP), dimethyl methyl phosphonate (DMMP), resorcinol bis(dixylenyl phosphate) (RDXP, such as commercially available PX-200, PX-201, and PX-202), phosphazene (such as commercially available SPB-100, SPH-100, and SPV-100), melamine polyphosphate, DOPO (9,10-dihydro-9-oxa-10-phosphaphenanthrene-10-oxide) and its derivatives or resins, DPPO (diphenylphosphine oxide) and its derivatives or resins, melamine cyanurate, tri-hydroxy ethyl isocyanurate, aluminium phosphinate (e.g., commercially available OP-930 and OP-935), and a combination thereof.

For example, the flame retardant may be a DPPO compound (e.g., di-DPPO compound, such as commercially available PQ-60), a DOPO compound (e.g., di-DOPO compound), a DOPO resin (e.g., DOPO-HQ, DOPO-NQ, DOPO-PN, and DOPO-BPN) and a DOPO-containing epoxy resin, wherein DOPO-PN is a DOPO phenol novolac compound, and DOPO-BPN may be a DOPO-containing bisphenol novolac compound, such as DOPO-BPAN (DOPO-bisphenol A novolac), DOPO-BPFN (DOPO-bisphenol F novolac) or DOPO-BPSN (DOPO-bisphenol S novolac).

For example, the curing accelerator (including curing initiator) may comprise a catalyst, such as a Lewis base or a Lewis acid. The Lewis base may comprise any one or more of imidazole, boron trifluoride-amine complex, ethyltriphenyl phosphonium chloride, 2-methylimidazole (2MI), 2-phenyl-1H-imidazole (2PZ), 2-ethyl-4-methyl imidazole (2E4MI), triphenylphosphine (TPP) and 4-dimethylaminopyridine (DMAP). The Lewis acid may comprise metal salt compounds, such as those of manganese, iron, cobalt, nickel, copper and zinc, such as zinc octanoate or cobalt octanoate. The curing accelerator also includes a curing initiator, such as a peroxide capable of producing free radicals, examples of curing initiator including but not limited to dicumyl peroxide, tert-butyl peroxybenzoate, dibenzoyl peroxide (BPO), 2,5-dimethyl-2,5-di(tert-butylperoxy)-3-hexyne peroxide (25B), bis(tert-butylperoxy isopropyl)benzene or a combination thereof.

For example, the polymerization inhibitor may comprise, but not limited to, 1,1-diphenyl-2-picrylhydrazyl radical, methyl acrylonitrile, 2,2,6,6-tetramethyl-1-oxo-piperidine, dithioester, nitroxide-mediated radical, triphenylmethyl radical, metal ion radical, sulfur radical, hydroquinone, 4-methoxyphenol, p-benzoquinone, phenothiazine, β-phenylnaphthylamine, 4-t-butylcatechol, methylene blue, 4,4'-butylidenebis(6-t-butyl-3-methylphenol), 2,2'-methylenebis (4-ethyl-6-t-butyl phenol) or a combination thereof. For example, the nitroxide-mediated radical may comprise, but not limited to, nitroxide radicals derived from cyclic hydroxylamines, such as 2,2,6,6-substituted piperidine 1-oxyl free radical, 2,2,5,5-substituted pyrrolidine 1-oxyl free radical or the like. Preferred substitutes include alkyl groups with 4 or fewer carbon atoms, such as methyl group or ethyl group. Examples of the compound containing a nitroxide radical include but are not limited to 2,2,6,6-tetramethylpiperidine 1-oxyl free radical, 2,2,6,6-tetraethylpiperidine 1-oxyl free radical, 2,2,6,6-tetramethyl-4-oxo-piperidine 1-oxyl free radical, 2,2,5,5-tetramethyl-pyrrolidine 1-oxyl free radical, 1,1,3,3-tetramethyl-2-isoindoline oxygen radical, N,N-di-tert-butylamine oxygen free radical and so on. Nitroxide radicals may also be replaced by using stable radicals such as galvinoxyl radicals. The polymerization inhibitor suitable for the resin composition of the present disclosure may include products derived from the polymerization inhibitor with its hydrogen atom or group substituted by other atom or group. Examples include products derived from a polymerization inhibitor with its hydrogen atom substituted by an amino group, a hydroxyl group, a carbonyl group or the like.

For example, the solvent suitable for the resin composition of the present disclosure is not particularly limited and may be any solvent suitable for dissolving the resin composition disclosed herein, examples including, but not limited to, methanol, ethanol, ethylene glycol monomethyl ether, acetone, butanone (methyl ethyl ketone), methyl isobutyl ketone, cyclohexanone, toluene, xylene, methoxyethyl acetate, ethoxyethyl acetate, propoxyethyl acetate, ethyl acetate, dimethylformamide, dimethylacetamide, propylene glycol monomethyl ether acetate, or a mixture thereof.

For example, the silane coupling agent may comprise silane (such as but not limited to siloxane) and may be further categorized according to the functional groups into amino silane, epoxide silane, vinyl silane, acrylate silane, methacrylate silane, hydroxyl silane, isocyanate silane, methacryloxy silane and acryloxy silane.

For example, the coloring agent may comprise but not limited to dye or pigment.

As used herein, the purpose of adding toughening agent is to improve the toughness of the resin composition. For example, the toughening agent may comprise, but not limited to, carboxyl-terminated butadiene acrylonitrile rubber (CTBN rubber), core-shell rubber, or a combination thereof.

The resin composition of various embodiments may be processed to make different articles, such as those suitable for use as components in electronic products, including but not limited to a prepreg, a resin film, a laminate or a printed circuit board.

For example, the resin composition from each embodiment of this disclosure can be used to make a prepreg, which comprises a reinforcement material and a layered structure disposed thereon. The layered structure is formed by heating the resin composition at a high temperature to the semi-cured state (B-stage). Suitable baking temperature for making a prepreg may be for example 120° C. to 180° C., preferably 120° C. to 160° C. The reinforcement material may be any one of a fiber material, woven fabric, and non-woven fabric, and the woven fabric preferably comprises fiberglass fabrics. Types of fiberglass fabrics are not particularly limited and may be any commercial fiberglass fabric used for various printed circuit boards, such as E-glass fabric, D-glass fabric, S-glass fabric, T-glass fabric, L-glass fabric or Q-glass fabric, wherein the fiber may comprise yarns and rovings, in spread form or standard form. Non-woven fabric preferably comprises liquid crystal polymer non-woven fabric, such as polyester non-woven fabric, polyurethane non-woven fabric and so on, but not limited thereto. Woven fabric may also comprise liquid crystal polymer woven fabric, such as polyester woven fabric, polyurethane woven fabric and so on, but not limited thereto. The reinforcement material may increase the mechanical strength of the prepreg. In one preferred embodiment, the reinforcement material can be optionally pre-treated by a silane coupling agent. The prepreg may be further heated and cured to the C-stage to form an insulation layer.

For example, the resin composition from each embodiment of this disclosure can be used to make a resin film, which is prepared by heating and baking to semi-cure the resin composition. The resin composition may be selectively coated on a polyethylene terephthalate film (PET film), a polyimide film (PI film), a copper foil or a resin-coated copper, followed by heating and baking to semi-cure the resin composition to form the resin film.

For example, the resin composition from each embodiment of this disclosure can be used to make a laminate, which comprises two metal foils and an insulation layer disposed between the metal foils, wherein the insulation layer is made by curing the resin composition at high temperature and high pressure to the C-stage, a suitable curing temperature being for example between 180° C. and 240° C. and preferably between 200° C. and 230° C. and a suitable curing time being 90 to 180 minutes and preferably 120 to 150 minutes. The insulation layer may be formed by curing the aforesaid prepreg or resin film to the C-stage. The metal foil may comprise copper, aluminum, nickel, platinum, silver, gold or alloy thereof, such as a copper foil. In one embodiment, the laminate is a copper-clad laminate (CCL).

In addition, the laminate may be further processed by trace formation processes to make a circuit board, such as a printed circuit board.

In one embodiment, the resin composition disclosed herein may achieve improvement in one or more of the following properties: flame retardancy, outgassing property, arc resistance, copper foil peeling strength, X-axis coefficient of thermal expansion, glass transition temperature and water absorption rate.

For example, the resin composition according to the present disclosure or the article made therefrom may achieve one, more or all of the following properties:
  an amount of collected volatile condensable materials of less than or equal to 0.019% and a total mass loss of less than or equal to 0.67% as measured from an outgassing test by reference to IPC-TM-650 2.6.4B, such as an amount of collected volatile condensable materials of between 0.010% and 0.019% and such as a total mass loss of between 0.41% and 0.67%.
  an arc resistance as measured by reference to IPC-TM-650 2.5.1B of greater than or equal to 105 seconds, such as between 105 seconds and 136 seconds;
  a copper foil peeling strength as measured by reference to IPC-TM-650 2.4.8 of greater than or equal to 4.05 lb/in, such as between 4.05 lb/in and 5.80 lb/in;
  an X-axis coefficient of thermal expansion as measured by reference to IPC-TM-650 2.4.24.5 of less than or equal to 13.2 ppm/° C., such as between 10.6 ppm/° C. and 13.2 ppm/° C.;
  a flame retardancy of V-0 rating as measured by reference to UL94, such as when a phosphorus content of the resin composition is between 0.75% and 2.00% in one embodiment;
  a glass transition temperature as measured by reference to IPC-TM-650 2.4.24.5 of greater than or equal to 201° C., such as between 201° C. and 288° C.; and
  a water absorption rate as measured by reference to IPC-TM-650 2.6.2.1a of less than or equal to 0.39%, such as between 0.18% and 0.39%.

Raw materials below were used to prepare the resin compositions of various Examples and Comparative Examples of the present disclosure according to the amount listed in Table 1 to Table 6 and further fabricated to prepare test samples.

Materials and reagents used in Examples and Comparative Examples disclosed herein are listed below:
  SA9000: methacrylate-containing polyphenylene ether resin, available from Sabic. OPE-2st 1200: vinylbenzyl-containing biphenyl polyphenylene ether resin, available from Mitsubishi Gas Chemical Co., Inc.
  BMI-70: bis(3-ethyl-5-methyl-4-maleimidephenyl)methane, available from K.I Chemical Industry Co., Ltd.
  MIR-5000: maleimide resin of Formula (IV), available from Nippon Kayaku.

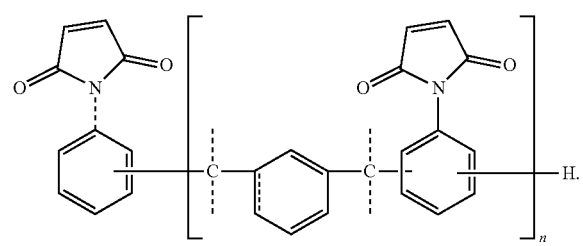

Formula (IV) wherein 1 ≤ n ≤ 5

BMI-80: bisphenol A diphenyl ether bismaleimide resin, available from K.I Chemical Industry Co., Ltd.
  Ricon 100: styrene-butadiene copolymer, available from Cray Valley.
  B-1000: polybutadiene resin, available from Nippon Soda Co., Ltd.
  Homide 801: prepolymer of diallyl bisphenol A and 4,4'-diphenyl methanebismaleimide in a ratio of 40:60, available from HOS-Technik.
  TM-124: diallyl bisphenol A, available from Evonik.
  Phosphorus-containing bismaleimide of Formula (II): available from Union Chemical Ind. Co., Ltd., having a phosphorus content of 4.5%.
  Compound of Formula (III): prepared by Applicant as described in the Synthesis Example, having a phosphorus content of 6%.

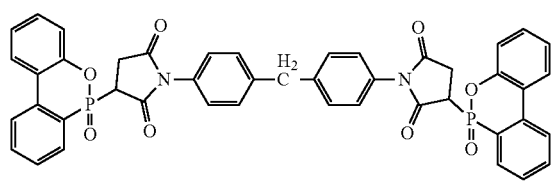

Formula (III)

Di-DOPO: compound of Formula (V), prepared by Applicant by reference to China Patent No. CN105936745B, having a phosphorus content of 12%.

Formula (V)

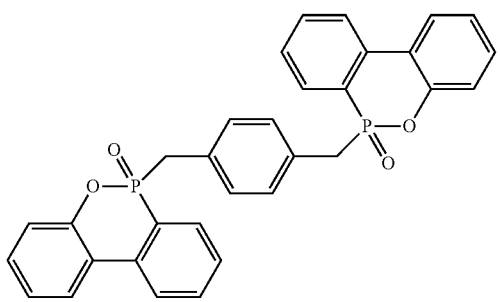

Di-DPPO: compound of Formula (VI), prepared by Applicant by reference to China Patent No. CN105440645B, having a phosphorus content of 12%.

Formula (VI)

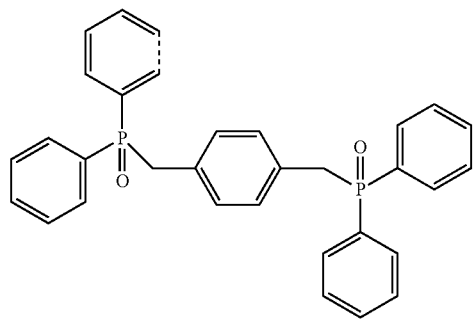

SPV-100: allyl-containing phosphazene, available from Otsuka Chemical Co., Ltd., having a phosphorus content of 13%.

PX-200: resorcinol bis(2,6-dixylenyl phosphate), commercially available from Daihachi Chemical Industry Co., Ltd., having a phosphorus content of 9%.

OP-945: aluminium diethyl phosphinate, commercially available from Clariant, having a phosphorus content of 23%.

MC-4: (methacryloyloxymethyl) diphenylphosphine oxide, commercially available from Katayama Chemical Industries Co., Ltd., having a phosphorus content of 8%.

MP-200 (Melapur 200): melamine polyphosphate, commercially available from BASF, having a phosphorus content of 13%.

SC-001: compound of Formula (VII), commercially available from Osaka Gas Chemicals Co., Ltd.

Formula (VII)

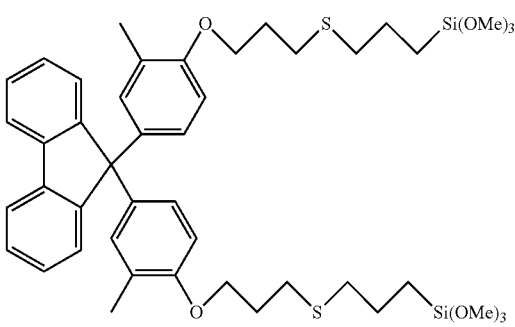

25B: 2,5-dimethyl-2,5-di(t-butylperoxy)-3-hexyne, available from NOF Corporation.

$SiO_2$: spherical silica pre-treated by silane coupling agent, product name SC2500

SXJ, available from Admatechs.

WZr: zirconium tungstate ($Zr(WO_4)_2$), available from Shenghe Resources.

LAS: petalite, available from Union Chemical Ind. Co.

MEK: methyl ethyl ketone, commercially available.

PMA: propylene glycol monomethyl ether acetate, commercially available.

Toluene: commercially available.

Solvent mixture: mixture of methyl ethyl ketone (MEK), propylene glycol monomethyl ether acetate (PMA) and toluene in a ratio of 3:1:1, prepared by Applicant.

Synthesis Example: Preparation of Compound of Formula (III)

15 parts by weight of DOPO (available from UFC Corp.) and 65 parts by weight of BMI-H (available from Tong Sing Chemicals Co., Ltd.) were placed in a container, followed by adding 65 parts by weight of DMF solution and then heated in the presence of $N_2$, wherein the heating process includes the following three stages:

1. the temperature was increased from room temperature to 70° C. to 80° C. in 50 minutes, and during the period the container was added slowly with 20 parts by weight of toluene solution;
2. the temperature was increased from 70° C. to 80° C. to 100° C. to 110° C. in 45 minutes; and
3. the temperature was maintained at 100° C. to 110° C. for 45 minutes.

The solution was allowed to cool to room temperature and placed in an electrothermal constant-temperature blowing dryer box to evaporated solvent to obtain the compound of Formula (III) as a solid.

Compositions and test results of resin compositions of Examples and Comparative Examples are listed below (in part by weight):

TABLE 1

Resin compositions of Examples (in part by weight) and test results

| Component | Name | E1 | E2 | E3 | E4 | E5 |
|---|---|---|---|---|---|---|
| vinyl-containing | SA9000 | 80 | 80 | 80 | 40 | 40 |
| polyphenylene ether resin | OPE-2st 1200 | | | | 40 | 40 |
| maleimide resin | BMI-70 | 20 | 20 | 20 | 10 | 10 |
| | MIR-5000 | | | | 10 | 10 |
| | BMI-80 | | | | | |
| polyolefin resin | Ricon 100 | | | | | |
| | B-1000 | | | | | |
| prepolymer of maleimide resin | Homide 801 | | | | | |
| diallyl bisphenol A | TM-124 | | | | | |
| phosphorus-containing bismaleimide | Formula (II) | 35 | 20 | 45 | 30 | 20 |
| | Formula (III) | | | | | |
| flame retardant | Di-DOPO | | | | | 15 |
| | Di-DPPO | | | | | |
| | SPV-100 | | | | | |
| | PX-200 | | | | | |
| | OP-945 | | | | | |
| | MC-4 | | | | | |
| | MP-200 | | | | | |
| siloxane compound | SC-001 | 0.5 | 0.5 | 0.5 | 0.5 | 0.5 |
| curing accelerator | 25B | 0.5 | 0.5 | 0.5 | 0.8 | 0.2 |
| inorganic filler | $SiO_2$ + WZr + LAS (4:1:1) | 150 | 150 | 150 | 180 | 120 |
| solvent mixture | MEK + PMA + toluene (3:1:1) | 100 | 100 | 100 | 120 | 140 |
| phosphorus content of resin composition (%) | | 1.16 | 0.75 | 1.40 | 1.00 | 2.00 |
| Property | Unit | E1 | E2 | E3 | E4 | E5 |
| flame retardancy | none | V-0 | V-0 | V-0 | V-0 | V-0 |
| CVCM amount | % | 0.010 | 0.013 | 0.015 | 0.017 | 0.015 |
| TML | % | 0.50 | 0.57 | 0.67 | 0.55 | 0.57 |
| arc resistance | second | 120 | 110 | 125 | 121 | 105 |
| copper foil peeling strength | lb/in | 5.50 | 5.30 | 5.80 | 5.45 | 5.09 |
| X-axis coefficient of thermal expansion | ppm/°C. | 12.5 | 12.8 | 12.1 | 12.7 | 12.7 |
| glass transition temperature | °C. | 220 | 210 | 240 | 260 | 255 |
| water absorption rate | % | 0.30 | 0.30 | 0.35 | 0.31 | 0.28 |

TABLE 2

Resin compositions of Examples (in part by weight) and test results

| Component | Name | E6 | E7 | E8 | E9 | E10 |
|---|---|---|---|---|---|---|
| vinyl-containing | SA9000 | 80 | 80 | 80 | 40 | 40 |
| polyphenylene ether resin | OPE-2st 1200 | | | | 40 | 40 |
| maleimide resin | BMI-70 | | | | | |
| | MIR-5000 | | | | | |
| | BMI-80 | | | | | |
| polyolefin resin | Ricon 100 | 20 | 20 | 20 | 10 | 10 |
| | B-1000 | | | | 10 | 10 |
| prepolymer of maleimide resin | Homide 801 | | | | | |
| diallyl bisphenol A | TM-124 | | | | | |
| phosphorus-containing bismaleimide | Formula (II) | 30 | 20 | 45 | 30 | 20 |
| | Formula (III) | | | | | |
| flame retardant | Di-DOPO | | | | | 15 |
| | Di-DPPO | | | | | |
| | SPV-100 | | | | | |
| | PX-200 | | | | | |
| | OP-945 | | | | | |
| | MC-4 | | | | | |
| | MP-200 | | | | | |
| siloxane compound | SC-001 | 0.5 | 0.5 | 0.5 | 0.5 | 0.5 |
| curing accelerator | 25B | 0.5 | 0.5 | 0.5 | 0.8 | 0.2 |
| inorganic filler | $SiO_2$ + WZr + LAS (4:1:1) | 150 | 150 | 150 | 180 | 120 |
| solvent mixture | MEK + PMA + toluene (3:1:1) | 100 | 100 | 100 | 120 | 140 |
| phosphorus content of resin composition (%) | | 1.04 | 0.75 | 1.29 | 0.75 | 2.00 |
| Property | Unit | E6 | E7 | E8 | E9 | E10 |
| flame retardancy | none | V-0 | V-0 | V-0 | V-0 | V-0 |

TABLE 2-continued

Resin compositions of Examples (in part by weight) and test results

| Component | Name | E6 | E7 | E8 | E9 | E10 |
|---|---|---|---|---|---|---|
| CVCM amount | % | 0.018 | 0.012 | 0.014 | 0.012 | 0.019 |
| TML | % | 0.44 | 0.41 | 0.45 | 0.44 | 0.43 |
| arc resistance | second | 110 | 107 | 113 | 111 | 107 |
| copper foil peeling strength | lb/in | 5.12 | 4.05 | 5.10 | 5.10 | 5.01 |
| X-axis coefficient of thermal expansion | ppm/° C. | 12.9 | 13.2 | 12.7 | 12.8 | 12.7 |
| glass transition temperature | ° C. | 205 | 201 | 210 | 207 | 201 |
| water absorption rate | % | 0.25 | 0.22 | 0.27 | 0.23 | 0.18 |

TABLE 3

Resin compositions of Examples (in part by weight) and test results

| Component | Name | E11 | E12 | E13 | E14 | E15 |
|---|---|---|---|---|---|---|
| vinyl-containing polyphenylene ether resin | SA9000 | | | | | |
| | OPE-2st 1200 | | | | | |
| maleimide resin | BMI-70 | | | | 10 | 10 |
| | MIR-5000 | | | | 10 | 10 |
| | BMI-80 | | | | | |
| polyolefin resin | Ricon 100 | | | | | |
| | B-1000 | | | | | |
| prepolymer of maleimide resin | Homide 801 | 100 | 100 | 100 | 80 | 75 |
| diallyl bisphenol A | TM-124 | | | | | 5 |
| phosphorus-containing bismaleimide | Formula (II) | 30 | 20 | 45 | 30 | 20 |
| | Formula (III) | | | | | |
| flame retardant | Di-DOPO | | | | | 15 |
| | Di-DPPO | | | | | |
| | SPV-100 | | | | | |
| | PX-200 | | | | | |
| | OP-945 | | | | | |
| | MC-4 | | | | | |
| | MP-200 | | | | | |
| siloxane compound | SC-001 | 0.5 | 0.5 | 0.5 | 0.5 | 0.5 |
| curing accelerator | 25B | | | | | |
| inorganic filler | SiO$_2$ + WZr + LAS (4:1:1) | 150 | 150 | 150 | 180 | 120 |
| solvent mixture | MEK + PMA + toluene (3:1:1) | 100 | 100 | 100 | 120 | 140 |
| phosphorus content of resin composition (%) | | 1.00 | 0.75 | 1.29 | 1.00 | 1.29 |
| Property | Unit | E11 | E12 | E13 | E14 | E15 |
| flame retardancy | none | V-0 | V-0 | V-0 | V-0 | V-0 |
| CVCM amount | % | 0.011 | 0.010 | 0.012 | 0.015 | 0.012 |
| TML | % | 0.45 | 0.44 | 0.42 | 0.45 | 0.47 |
| arc resistance | second | 125 | 120 | 136 | 112 | 105 |
| copper foil peeling strength | lb/in | 5.35 | 5.28 | 5.43 | 5.21 | 5.25 |
| X-axis coefficient of thermal expansion | ppm/° C. | 11.0 | 11.7 | 10.6 | 12.0 | 12.2 |
| glass transition temperature | ° C. | 280 | 271 | 288 | 265 | 262 |
| water absorption rate | % | 0.36 | 0.34 | 0.39 | 0.32 | 0.30 |

TABLE 4

Resin compositions of Comparative Examples (in part by weight) and test results

| Component | Name | C1 | C2 | C3 | C4 | C5 |
|---|---|---|---|---|---|---|
| vinyl-containing polyphenylene ether resin | SA9000 | 80 | 80 | 80 | 80 | 80 |
| | OPE-2st 1200 | | | | | |
| maleimide resin | BMI-70 | 20 | 20 | 20 | 20 | 20 |
| | MIR-5000 | | | | | |
| | BMI-80 | | | | | |
| polyolefin resin | Ricon 100 | | | | | |
| | B-1000 | | | | | |

TABLE 4-continued

Resin compositions of Comparative Examples (in part by weight) and test results

| Component | Name | C1 | C2 | C3 | C4 | C5 |
|---|---|---|---|---|---|---|
| prepolymer of maleimide resin | Homide 801 | | | | | |
| diallyl bisphenol A | TM-124 | | | | | |
| phosphorus-containing bismaleimide | Formula (II) | | | | | |
| | Formula (III) | 35 | | | | |
| flame retardant | Di-DOPO | | 35 | | | |
| | Di-DPPO | | | 35 | | |
| | SPV-100 | | | | 35 | |
| | PX-200 | | | | | 35 |
| | OP-945 | | | | | |
| | MC-4 | | | | | |
| | MP-200 | | | | | |
| siloxane compound | SC-001 | 0.5 | 0.5 | 0.5 | 0.5 | 0.5 |
| curing accelerator | 25B | 0.5 | 0.5 | 0.5 | 0.5 | 0.5 |
| inorganic filler | SiO$_2$ + WZr + LAS (4:1:1) | 150 | 150 | 150 | 150 | 150 |
| solvent mixture | MEK + PMA + toluene (3:1:1) | 100 | 100 | 100 | 100 | 100 |
| phosphorus content of resin composition (%) | | 1.50 | 3.10 | 3.10 | 3.20 | 2.30 |
| Property | Unit | C1 | C2 | C3 | C4 | C5 |
| flame retardancy | none | V-0 | V-0 | V-0 | HB | Burnout |
| CVCM amount | % | 0.059 | 0.057 | 0.120 | 0.150 | 0.200 |
| TML | % | 0.89 | 0.82 | 0.98 | 1.03 | 1.10 |
| arc resistance | second | 96 | 89 | 80 | 87 | 60 |
| copper foil peeling strength | lb/in | 4.12 | 3.85 | 3.41 | 3.95 | 3.15 |
| X-axis coefficient of thermal expansion | ppm/°C. | 13.5 | 13.7 | 13.8 | 15.2 | 16.0 |
| glass transition temperature | °C. | 200 | 205 | 205 | 190 | 168 |
| water absorption rate | % | 0.55 | 0.29 | 0.28 | 0.42 | 0.55 |

TABLE 5

Resin compositions of Comparative Examples (in part by weight) and test results

| Component | Name | C6 | C7 | C8 | C9 | C10 |
|---|---|---|---|---|---|---|
| vinyl-containing polyphenylene ether resin | SA9000 | 80 | 80 | 80 | 80 | 80 |
| | OPE-2st 1200 | | | | | |
| maleimide resin | BMI-70 | 20 | 20 | 20 | | |
| | MIR-5000 | | | | | |
| | BMI-80 | | | 15 | | |
| polyolefin resin | Ricon 100 | | | | 20 | 20 |
| | B-1000 | | | | | |
| prepolymer of maleimide resin | Homide 801 | | | | | |
| diallyl bisphenol A | TM-124 | | | | | |
| phosphorus-containing bismaleimide | Formula (II) | | | | | |
| | Formula (III) | | | | 30 | |
| flame retardant | Di-DOPO | | | | | 30 |
| | Di-DPPO | | | | | |
| | SPV-100 | | | | | |
| | PX-200 | | | | | |
| | OP-945 | 35 | | | | |
| | MC-4 | | 35 | | | |
| | MP-200 | | | 35 | | |
| siloxane compound | SC-001 | 0.5 | 0.5 | 0.5 | 0.5 | 0.5 |
| curing accelerator | 25B | 0.5 | 0.5 | 0.5 | 0.5 | 0.5 |
| inorganic filler | SiO$_2$ + WZr + LAS (4:1:1) | 150 | 150 | 150 | 150 | 150 |
| solvent mixture | MEK + PMA + toluene (3:1:1) | 100 | 100 | 100 | 100 | 100 |
| phosphorus content of resin composition (%) | | 6.00 | 2.10 | 3.30 | 1.38 | 2.80 |
| Property | Unit | C6 | C7 | C8 | C9 | C10 |
| flame retardancy | none | V-0 | V-1 | V-0 | V-0 | V-0 |
| CVCM amount | % | 0.170 | 0.110 | 0.140 | 0.098 | 0.078 |
| TML | % | 1.05 | 1.02 | 1.08 | 0.93 | 0.85 |

TABLE 5-continued

Resin compositions of Comparative Examples (in part by weight) and test results

| Component | Name | C6 | C7 | C8 | C9 | C10 |
|---|---|---|---|---|---|---|
| arc resistance | second | 65 | 79 | 80 | 76 | 75 |
| copper foil peeling strength | lb/in | 3.03 | 3.42 | 3.15 | 3.05 | 3.15 |
| X-axis coefficient of thermal expansion | ppm/° C. | 14.4 | 15.2 | 16.0 | 16.3 | 15.7 |
| glass transition temperature | ° C. | 175 | 179 | 224 | 155 | 170 |
| water absorption rate | % | 0.57 | 0.52 | 0.53 | 0.43 | 0.32 |

TABLE 6

Resin compositions of Comparative Examples (in part by weight) and test results

| Component | Name | C11 | C12 | C13 | C14 | C15 |
|---|---|---|---|---|---|---|
| vinyl-containing polyphenylene ether resin | SA9000 | | | | 80 | 80 |
| | OPE-2st 1200 | | | | | |
| maleimide resin | BMI-70 | | | 60 | 20 | 20 |
| | MIR-5000 | | | | | |
| | BMI-80 | | | | | |
| polyolefin resin | Ricon 100 | | | | | |
| | B-1000 | | | | | |
| prepolymer of maleimide resin | Homide 801 | 100 | 100 | | | |
| diallyl bisphenol A | TM-124 | | | 40 | | |
| phosphorus-containing bismaleimide | Formula (II) | | | 30 | 5 | 70 |
| | Formula (III) | 30 | | | | |
| flame retardant | Di-DOPO | | 30 | | | |
| | Di-DPPO | | | | | |
| | SPV-100 | | | | | |
| | PX-200 | | | | | |
| | OP-945 | | | | | |
| | MC-4 | | | | | |
| | MP-200 | | | | | |
| siloxane compound | SC-001 | 0.5 | 0.5 | 0.5 | 0.5 | 0.5 |
| curing accelerator | 25B | | | | 0.5 | 0.5 |
| inorganic filler | SiO$_2$ + WZr + LAS (4:1:1) | 150 | 150 | 150 | 150 | 150 |
| solvent mixture | MEK + PMA + toluene (3:1:1) | 100 | 100 | 100 | 100 | 150 |
| phosphorus content of resin composition (%) | | 1.38 | 2.76 | 1.04 | 0.20 | 1.85 |
| Property | Unit | C11 | C12 | C13 | C14 | C15 |
| flame retardancy | none | V-0 | V-0 | V-0 | HB | V-0 |
| CVCM amount | % | 0.079 | 0.077 | 0.130 | 0.010 | 0.012 |
| TML | % | 0.89 | 0.92 | 2.05 | 0.61 | 0.59 |
| arc resistance | second | 105 | 99 | 67 | 79 | 125 |
| copper foil peeling strength | lb/in | 4.12 | 4.05 | 4.02 | 3.56 | 3.89 |
| X-axis coefficient of thermal expansion | ppm/° C. | 12.8 | 12.2 | 13.5 | 14.5 | 12.1 |
| glass transition temperature | ° C. | 198 | 230 | 190 | 220 | 255 |
| water absorption rate | % | 0.55 | 0.40 | 0.50 | 0.28 | 0.61 |

Samples (specimens) for the properties measured above were prepared as described below and tested and analyzed under specified conditions below.

1. Prepreg: Resin composition (in part by weight) from each Example (E1-E15) or each Comparative Example (C$_1$-C$_{15}$) was separately added to a stirred tank and well-mixed to form a varnish. Then the varnish was loaded to an impregnation tank, and a fiberglass fabric (e.g., 2116 E-glass fiber fabric, available from Asahi) was impregnated into the impregnation tank to adhere the resin composition onto the fiberglass fabric, followed by heating and baking at 140-160° C. for about 3 minutes to obtain a prepreg. Each prepreg made from the 2116 E-glass fiber fabric has a resin content of about 55%.

2. Copper-containing laminate 1 (i.e., copper-clad laminate 1, formed by lamination of two prepregs): Two 35 μm reverse treatment copper foils (RTFs) and two prepregs obtained from 2116 E-glass fiber fabrics impregnated with each Example or Comparative Example were prepared, each prepreg having a resin content of about 55%. A copper foil, two prepregs and a copper foil were superimposed in such order and then subjected to a vacuum condition for lamination at 46 kgf/cm$^2$ pressure and 230° C. for 120 minutes to form each copper-containing laminate 1. Insulation layers were formed by laminating two sheets of prepreg between the two copper foils, and the resin content of the insulation layers is about 55%.

3. Copper-containing laminate 2 (formed by lamination of eight prepregs): Two 35 μm reverse treatment copper foils and eight prepregs obtained from 2116 E-glass fiber fabrics impregnated with each Example or Comparative Example were prepared, each prepreg having a resin content of about 55%. A copper foil, eight prepregs and a copper foil were superimposed in such order and then subjected to a vacuum condition for lamination at 46 kgf/cm² pressure and 230° C. for 120 minutes to form each copper-containing laminate 2. Insulation layers were formed by laminating eight sheets of prepreg between the two copper foils, and the resin content of the insulation layers is about 55%.

4. Copper-containing laminate 3 (formed by lamination of sixteen prepregs): Two 35 μm reverse treatment copper foils and sixteen prepregs obtained from 2116 E-glass fiber fabrics impregnated with each Example or Comparative Example were prepared, each prepreg having a resin content of about 55%. A copper foil, sixteen prepregs and a copper foil were superimposed in such order and then subjected to a vacuum condition for lamination at 46 kgf/cm² pressure and 230° C. for 120 minutes to form each copper-containing laminate 3. Insulation layers were formed by laminating sixteen sheets of prepreg between the two copper foils, and the resin content of the insulation layers is about 55%.

5. Copper-containing laminate 4 (formed by lamination of thirty-two prepregs): Two 35 μm reverse treatment copper foils and thirty-two prepregs obtained from 2116 E-glass fiber fabrics impregnated with each Example or Comparative Example were prepared, each prepreg having a resin content of about 55%. A copper foil, thirty-two prepregs and a copper foil were superimposed in such order and then subjected to a vacuum condition for lamination at 46 kgf/cm² pressure and 230° C. for 120 minutes to form each copper-containing laminate 4. Insulation layers were formed by laminating thirty-two sheets of prepreg between the two copper foils, and the resin content of the insulation layers is about 55%.

6. Copper-free laminate 1 (formed by lamination of two prepregs): Each aforesaid copper-containing laminate 1 (formed by lamination of two prepregs) was etched to remove the two copper foils to obtain a copper-free laminate 1 (formed by lamination of two prepregs) having a resin content of about 55%.

7. Copper-free laminate 2 (formed by lamination of eight prepregs): Each aforesaid copper-containing laminate 2 (formed by lamination of eight prepregs) was etched to remove the two copper foils to obtain a copper-free laminate 2 (formed by lamination of eight prepregs) having a resin content of about 55%.

8. Copper-free laminate 3 (formed by lamination of sixteen prepregs): Each aforesaid copper-containing laminate 3 (formed by lamination of sixteen prepregs) was etched to remove the two copper foils to obtain a copper-free laminate 3 (formed by lamination of sixteen prepregs) having a resin content of about 55%.

9. Copper-free laminate 4 (formed by lamination of thirty-two prepregs): Each aforesaid copper-containing laminate 4 (formed by lamination of thirty-two prepregs) was etched to remove the two copper foils to obtain a copper-free laminate 4 (formed by lamination of thirty-two prepregs) having a resin content of about 55%.

Test items and test methods are described below.

Flame Retardancy

The aforesaid copper-free laminate 3 (obtained by laminating sixteen prepregs, resin content of about 55%) sample having a size of 125 mm×13 mm was subjected to flame retardancy measurement. The flame retardancy test was performed in accordance with the UL94 rating, and the results were represented by V-0, V-1, or V-2, wherein V-0 indicates a superior flame retardancy to V-1, V-1 indicates a superior flame retardancy to V-2, and burnout of sample is the worst. For example, articles made from the resin composition disclosed herein have a flame retardancy of V-0 as measured by reference to the UL94 rating.

Outgassing Property

In the outgassing property test, a copper-free laminate 2 (formed by lamination of eight prepregs, resin content of about 55%) was cut into a small piece of about 200 mg to serve as the sample. By reference to the process according to IPC-TM-650 2.6.4B, the sample was pretreated for 24 hours at 50% relative humidity and 23±2° C. and then weighed. After being weighed, the sample was placed in a test chamber with a temperature set at 125° C. and a vacuum degree of at least $5\times10^{-5}$ torr for testing for 24 hours. During the 24-hour period, volatile materials from the sample were released from a port of the test chamber and condensed on a cooling collection plate (25±1° C.). After 24 hours, the sample was cooled to room temperature, and the sample and the collected volatile condensable materials were weighed to determine the amount of total mass loss and the amount of collected volatile condensable materials on the collection plate.

In the technical field to which the present disclosure pertains, lower total mass loss and lower collected volatile condensable materials are better. A difference in total mass loss of greater than or equal to 0.10% and a difference in collected volatile condensable materials of greater than or equal to 0.01% represent a significant difference (i.e., significant technical difficulty) in the outgassing test of different laminates. For example, articles made from the resin composition disclosed herein have a total mass loss of less than or equal to 0.67%, such as between 0.41% and 0.67%, and an amount of collected volatile condensable materials of less than or equal to 0.019%, such as between 0.010% and 0.019%, as measured by reference to IPC-TM-650 2.6.4B.

Arc Resistance

The aforesaid copper-free laminate 4 (obtained by laminating thirty-two prepregs, resin content of about 55%) sample having a size of 76 mm×50 mm was subjected to the arc resistance test. By reference to the processes described in IPC-TM-650 2.5.1B, the sample was immersed in distilled water at 50±2° C. for 48 hours and then immersed in distilled water at room temperature for 0.5 to 4 hours to achieve temperature balance of the sample; after that, a sheet of pretreated sample was removed from the distilled water at room temperature, wiped to remove water on the surface, and placed in an arc tester; the arc tester was switched on to generate arc, and the arc was carefully observed to measure and record the time between which arc disappears and leakage trace appears on the sample, unit being accurate to second.

In the technical field to which the present disclosure pertains, longer arc resistance time is better. A difference in arc resistance of greater than or equal to 5 seconds represents a substantial difference (i.e., significant technical difficulty) in arc resistance in different laminates. For example, articles made from the resin composition disclosed herein have an arc resistance as measured by reference to IPC-TM-650 2.5.1B of greater than or equal to 105 seconds, such as between 105 seconds and 136 seconds.

Copper Foil Peeling Strength (a.k.a. Peeling Strength, P/S)

In the copper foil peeling strength test, the copper-containing laminate 2 (obtained by laminating eight prepregs, resin content of about 55%) was cut into a rectangular specimen with a width of 24 mm and a length of greater than 60 mm, which was etched to remove surface copper foil, leaving a rectangular copper foil with a width of 3.18 mm and a length of greater than 60 mm, and tested by using a tensile strength tester by reference to IPC-TM-650 2.4.8 at room temperature (about 25° C.) to measure the force (lb/in) required to separate the copper foil from the insulation layer of the laminate.

In the technical field to which the present disclosure pertains, higher copper foil peeling strength is better. A difference in copper foil peeling strength of greater than or equal to 0.15 lb/in represents a substantial difference (i.e., significant technical difficulty) in copper foil peeling strength in different laminates. For example, articles made from the resin composition disclosed herein have a copper foil peeling strength as measured by reference to IPC-TM-650 2.4.8 of greater than or equal to 4.05 lb/in, such as between 4.05 lb/in and 5.80 lb/in.

X-Axis Coefficient of Thermal Expansion (X-CTE)

The copper-free laminate 1 (obtained by laminating two prepregs) sample was tested by thermal mechanical analysis (TMA) during the measurement of X-axis coefficient of thermal expansion. The copper-free laminate 1 was cut into a sample with a length of 10 mm and a width of 10 mm. Each sample was heated from 35° C. to 300° C. at a heating rate of 10° C./minute and then subjected to the measurement of the coefficient of thermal expansion (ppm/° C.) in X-axis in a temperature range (designated as α1) of 40° C. to 125° C. by reference to IPC-TM-650 2.4.24.5.

In the technical field to which the present disclosure pertains, lower X-axis coefficient of thermal expansion represents a better dimensional expansion property. A difference in X-axis coefficient of thermal expansion of greater than or equal to 0.5 ppm/° C. represents a substantial difference (i.e., significant technical difficulty) in X-axis coefficient of thermal expansion in different laminates. For example, articles made from the resin composition disclosed herein have an X-axis coefficient of thermal expansion as measured by reference to IPC-TM-650 2.4.24.5 of less than or equal to 13.2 ppm/° C., such as between 10.6 ppm/° C. and 13.2 ppm/° C.

Glass Transition Temperature (Tg)

The copper-free laminate 2 (obtained by laminating eight prepregs) sample was subjected to glass transition temperature measurement by using the thermal mechanical analysis (TMA) method. Each sample was heated from 35° C. to 350° C. at a heating rate of 10° C./minute and then subjected to the measurement of glass transition temperature (° C.) by reference to the method described in IPC-TM-650 2.4.24.5.

In the technical field to which the present disclosure pertains, higher glass transition temperature is better. A difference in glass transition temperature of greater than or equal to 5° C. represents a substantial difference (i.e., significant technical difficulty) in glass transition temperature in different laminates. For example, articles made from the resin composition disclosed herein have a glass transition temperature of greater than or equal to 201° C. as measured by reference to IPC-TM-650 2.4.24.5, such as between 201° C. and 288° C.

Water Absorption Rate

In the water absorption rate test, a 2 inch*2 inch copper-free laminate 2 sample obtained by laminating eight prepregs was placed in a 105±10° C. oven and baked for 1 hour, then cooled at room temperature of about 23° C. for 10 minutes and weighed to give a weight value W1 representing the weight of the copper-free laminate 2; then the copper-free laminate 2 sample was immersed and soaked in pure water at room temperature for 24 hours, then withdrawn from the pure water and wiped to remove residual water on the surface, and the sample was weighed again to give a weight value W2 representing the weight of the copper-free laminate 2 after water absorption. The water absorption rate W by reference to IPC-TM-650 2.6.2.1a was calculated as follow: W (%)=((W2−W1)/W1)×100%.

In the technical field to which the present disclosure pertains, lower water absorption rate is better. A difference in water absorption rate of greater than or equal to 0.10% represents a substantial difference (i.e., significant technical difficulty) in water absorption rate in different laminates. For example, articles made from the resin composition disclosed herein have a water absorption rate as measured by reference to IPC-TM-650 2.6.2.1a of less than or equal to 0.39%, such as between 0.18% and 0.39%.

The following observations can be made from Table 1 to Table 6.

Resin compositions containing 20 parts by weight to 45 parts by weight of the phosphorus-containing bismaleimide and 100 parts by weight of the thermosetting resin, such as Examples E1 to E15, can all achieve at the same time the properties including amount of collected volatile condensable materials of less than or equal to 0.019% in the outgassing test, a total mass loss of less than or equal to 0.67% in the outgassing test, arc resistance of greater than or equal to 105 seconds, copper foil peeling strength of greater than or equal to 4.05 lb/in and X-axis coefficient of thermal expansion of less than or equal to 13.2 ppm/° C.; in contrast, Comparative Examples C1 to C15 fail to achieve desirable results in at least one of outgassing test, arc resistance, copper foil peeling strength and X-axis coefficient of thermal expansion.

In the system of a thermosetting resin containing a vinyl-containing polyphenylene ether resin and a maleimide resin, it can be observed that in contrast to Examples E1 to E5, if the compound of Formula (III) which is different from the phosphorus-containing bismaleimide of the present disclosure is used in the resin composition, such as Comparative Example C1, desirable improvement in properties including outgassing test, arc resistance, X-axis coefficient of thermal expansion, glass transition temperature and water absorption rate was not achieved.

In the system of a thermosetting resin containing a vinyl-containing polyphenylene ether resin and a maleimide resin, it can be observed that in contrast to Examples E1 to E5, if the resin composition does not contain the phosphorus-containing bismaleimide as disclosed herein but contains other flame retardants, such as Comparative Examples C2 to C8, desirable improvement in properties including outgassing test, arc resistance, copper foil peeling strength and X-axis coefficient of thermal expansion was not achieved. In addition, Comparative Examples C4, C5 and C7 failed to achieve a flame retardancy of V-0 rating.

In the system of a thermosetting resin containing a vinyl-containing polyphenylene ether resin and a polyolefin resin, it can be observed that in contrast to Examples E6 to E10, if the compound of Formula (III) which is different from the phosphorus-containing bismaleimide of the present disclosure is used in the resin composition, such as Comparative Example C9, desirable improvement in properties including outgassing test, arc resistance, copper foil peeling strength, X-axis coefficient of thermal expansion, glass transition temperature and water absorption rate was not achieved.

In the system of a thermosetting resin containing a vinyl-containing polyphenylene ether resin and a polyolefin resin, it can be observed that in contrast to Examples E6 to E10, if the resin composition does not contain the phosphorus-containing bismaleimide as disclosed herein but contains a different flame retardant, such as Comparative Example C10, desirable improvement in properties including outgassing test, arc resistance, copper foil peeling strength, X-axis coefficient of thermal expansion and glass transition temperature was not achieved.

In the system of a thermosetting resin containing a prepolymer of maleimide resin, it can be observed that in contrast to Examples E11 to E15, if the compound of Formula (III) which is different from the phosphorus-containing bismaleimide of the present disclosure is used in the resin composition, such as Comparative Example C11, desirable improvement in properties including outgassing test, glass transition temperature and water absorption rate was not achieved.

In the system of a thermosetting resin containing a prepolymer of maleimide resin, it can be observed that in contrast to Examples E11 to E15, if the resin composition does not contain the phosphorus-containing bismaleimide as disclosed herein but contains a different flame retardant, such as Comparative Example C12, desirable improvement in properties including outgassing test, arc resistance and water absorption rate was not achieved.

Compared with Examples E11 to E15, instead of using a prepolymer of maleimide resin and diallyl bisphenol A in the resin composition, Comparative Example C13 contains maleimide resin and diallyl bisphenol A without prepolymerization, which fails to achieve desirable improvement in properties including outgassing test, arc resistance, copper foil peeling strength, X-axis coefficient of thermal expansion, glass transition temperature and water absorption rate.

On the other hand, by observing Comparative Example C14 or C15, it can be found that if the amount of the phosphorus-containing bismaleimide disclosed herein, relative to 100 parts by weight of the thermosetting resin, is 5 parts by weight or 70 parts by weight, desirable improvement in copper foil peeling strength, as well as in flame retardancy, arc resistance, X-axis coefficient of thermal expansion and water absorption rate, was not achieved.

In general, the resin composition of the present disclosure can achieve at the same time desirable properties including an amount of collected volatile condensable materials of less than or equal to 0.019% in the outgassing test, a total mass loss of less than or equal to 0.67% in the outgassing test, an arc resistance of greater than or equal to 105 seconds, a copper foil peeling strength of greater than or equal to 4.05 lb/in, an X-axis coefficient of thermal expansion of less than or equal to 13.2 ppm/° C., a flame retardancy of V-0 rating, a glass transition temperature of greater than or equal to 201° C. and a water absorption rate of less than or equal to 0.39%.

The above detailed description is merely illustrative in nature and is not intended to limit the embodiments of the subject matter or the application and use of such embodiments. As used herein, the term "exemplary" means "serving as an example, instance, or illustration." Any implementation described herein as exemplary is not necessarily to be construed as preferred or advantageous over other implementations.

Moreover, while at least one exemplary example or comparative example has been presented in the foregoing detailed description, it should be appreciated that a vast number of variations exist. It should also be appreciated that the exemplary one or more embodiments described herein are not intended to limit the scope, applicability, or configuration of the claimed subject matter in any way. Rather, the foregoing detailed description will provide those skilled in the art with a convenient guide for implementing the described one or more embodiments. Also, various changes can be made in the function and arrangement of elements without departing from the scope defined by the claims, which include known equivalents and foreseeable equivalents at the time of filing this patent application.

What is claimed is:

1. A resin composition, comprising 20 parts by weight to 45 parts by weight of a phosphorus-containing bismaleimide and 100 parts by weight of a thermosetting resin, wherein:
   the phosphorus-containing bismaleimide has a structure of Formula (1):

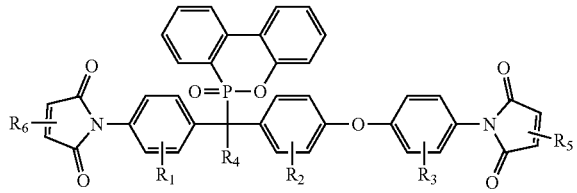

Formula (I)

wherein $R_1$ is a hydrogen atom, a methyl group or an ethyl group; $R_2$ is a hydrogen atom or a methyl group; $R_3$ is a hydrogen atom or a $C_1$-$C_6$ alkyl group; $R_4$ is a hydrogen atom or a $C_1$-$C_6$ alkyl group; $R_5$ is a hydrogen atom or a $C_1$-$C_6$ alkyl group; and $R_6$ is a hydrogen atom or a $C_1$-$C_6$ alkyl group; and the thermosetting resin is selected from the group consisting of a vinyl-containing polyphenylene ether resin, a maleimide resin other than the phosphorus-containing bismaleimide, a polyolefin resin, a prepolymer of maleimide resin, and a combination thereof.

2. The resin composition of claim 1, wherein the vinyl-containing polyphenylene ether resin comprises a vinylbenzyl-containing biphenyl polyphenylene ether resin, a methacrylate-containing polyphenylene ether resin, a vinylbenzyl-containing bisphenol A polyphenylene ether resin, a chain-extended vinyl-containing polyphenylene ether resin, or a combination thereof.

3. The resin composition of claim 1, wherein the maleimide resin comprises a bisphenol A diphenyl ether bismaleimide resin, bis(3-ethyl-5-methyl-4-maleimidephenyl)methane, a maleimide resin of Formula (IV), 4,4'-diphenylmethane bismaleimide resin, or a combination thereof, Formula (IV), wherein 1≤ n≤ 5

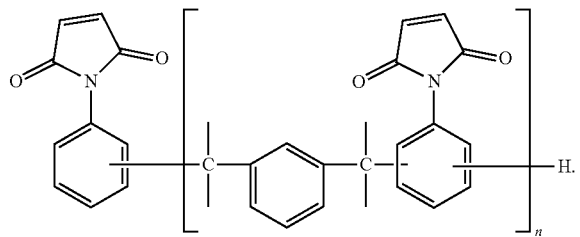

4. The resin composition of claim 1, wherein the polyolefin resin comprises a styrene-butadiene copolymer, a polybutadiene resin, or a combination thereof.

5. The resin composition of claim 1, wherein the prepolymer of maleimide resin comprises a prepolymer of diallyl compound and maleimide resin, a prepolymer of diamine and maleimide resin, a prepolymer of multi-functional amine and maleimide resin, a prepolymer of acid phenol compound and maleimide resin, or a combination thereof.

6. The resin composition of claim 1, further comprising inorganic filler, flame retardant, curing accelerator, polymerization inhibitor, solvent, silane coupling agent, coloring agent, toughening agent, or a combination thereof.

7. An article made from the resin composition of claim 1, comprising a prepreg, a resin film, a laminate or a printed circuit board.

8. The article of claim 7, having an amount of collected volatile condensable materials of less than or equal to 0.019% and a total mass loss of less than or equal to 0.67% as measured from an outgas sing test by reference to IPC-TM-650 2.6.4B.

9. The article of claim 7, having an arc resistance as measured by reference to IPC-TM-650 2.5.1B of greater than or equal to 105 seconds.

10. The article of claim 7, having a copper foil peeling strength as measured by reference to IPC-TM-650 2.4.8 of greater than or equal to 4.05 lb/in.

11. The article of claim 7, having an X-axis coefficient of thermal expansion as measured by reference to IPC-TM-650 2.4.24.5 of less than or equal to 13.2 ppm/° C.

* * * * *